US012314333B1

(12) United States Patent
Mahyar et al.

(10) Patent No.: US 12,314,333 B1
(45) Date of Patent: May 27, 2025

(54) ACTIVELY GUIDED CONTENT RECOMMENDATION

(71) Applicant: Amazon Technologies, Inc., Seattle, WA (US)

(72) Inventors: Hooman Mahyar, Mercer Island, WA (US); Nikhil Vijay Kajale, Sammamish, WA (US); Arjun Cholkar, Bothell, WA (US); Rafael Soltanovich, Woodland Hills, CA (US); Hani Suleiman, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/471,121

(22) Filed: Sep. 20, 2023

(51) Int. Cl.
*G06F 16/9535* (2019.01)
(52) U.S. Cl.
CPC .................. *G06F 16/9535* (2019.01)
(58) Field of Classification Search
CPC .................................... G06F 16/9535
See application file for complete search history.

(56) References Cited

U.S. PATENT DOCUMENTS

| 8,819,735 | B2* | 8/2014 | Rai | H04N 21/482 |
| | | | | 725/39 |
| 2002/0143864 | A1* | 10/2002 | Page | G06F 16/954 |
| | | | | 707/999.003 |
| 2006/0149674 | A1* | 7/2006 | Cook | G06Q 40/02 |
| | | | | 705/44 |
| 2009/0062623 | A1* | 3/2009 | Cohen | G16H 70/60 |
| | | | | 600/300 |
| 2020/0192983 | A1* | 6/2020 | Deng | G06F 40/30 |
| 2020/0365134 | A1* | 11/2020 | Tu | G10L 15/04 |
| 2020/0401305 | A1* | 12/2020 | Singh | G06F 3/04847 |
| 2022/0027407 | A1* | 1/2022 | Ikezoye | G06F 16/637 |
| 2023/0177631 | A1* | 6/2023 | Tatunashvili | G06Q 50/205 |
| | | | | 705/326 |

* cited by examiner

*Primary Examiner* — Etienne P Leroux
(74) *Attorney, Agent, or Firm* — Athorus, PLLC

(57) ABSTRACT

Described are example systems and methods generally directed to systems and methods for a real-time content recommendation service employing active guidance to facilitate efficient and effective recommendations of content to a user. A plurality of characteristic information associated with content items from a corpus of content items can be obtained and used to generate a content graph and a discovery map/decision tree. The discovery maps/decision trees may include content items and/or segments of content items that are arranged and connected in the discovery maps/decision trees based on their associated characteristic information to facilitate guided recommendations of content based on user interactions. The discovery map/decision tree may then be accessed to provide guided recommendations of content.

19 Claims, 8 Drawing Sheets

ACTIVELY GUIDED CONTENT RECOMMENDATION

BACKGROUND

With the proliferation of digital technology, the manner in how people access and consume content, such as videos, television shows, movies, books, music, and the like, has been transformed. For example, people can now access and/or consume seemingly endless libraries of digital content at practically any time on virtually any type of device (e.g., smart televisions, tablet computers, personal computers, mobile phones, etc.). However, given the sheer volume of content, it can often be difficult to identify a particular content to consume. Further, although many platforms may provide content recommendations, oftentimes, the number of recommended content may require users to browse through large carousels of recommended content, may not align with the type of content being sought by the user, and the like.

DETAILED DESCRIPTION

Figure 1:
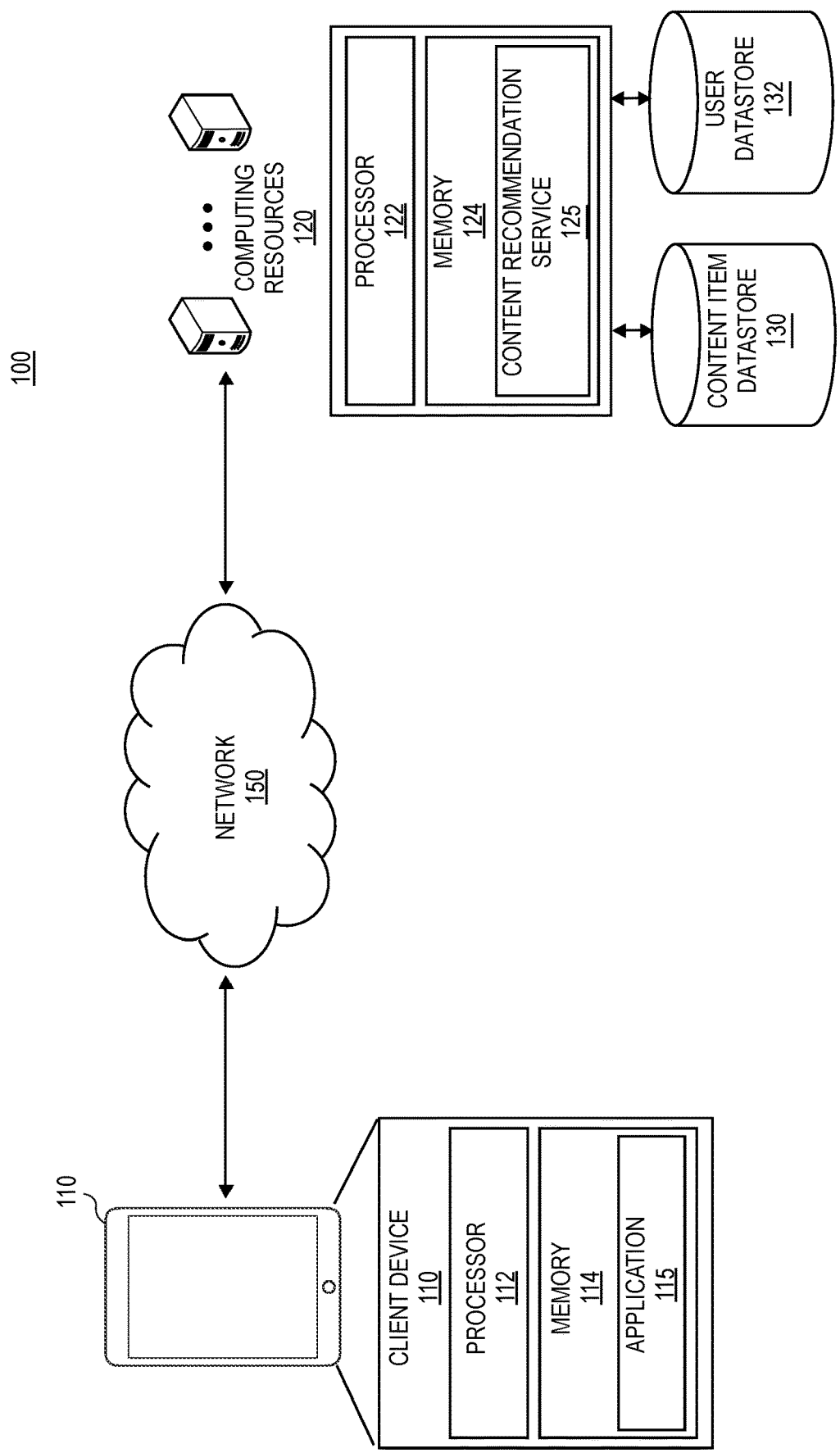
FIG. 1 is an illustration of an exemplary computing environment, according to exemplary embodiments of the present disclosure.

As is set forth in greater detail below, embodiments of the present disclosure are generally directed to systems and methods for a real-time content recommendation service employing active guidance to facilitate efficient and effective recommendations of content to a user. For example, exemplary embodiments of the present disclosure can obtain a plurality of characteristic information associated with content items from a corpus of content items. The characteristic information may relate to features of the content items and may be extracted by one or more machine learning models. According to certain aspects of the present disclosure, the characteristic information may include information regarding features of the content items, such as themes, moods, audio, cast, color palettes, video/audio quality, topics, styles, aesthetics, languages, genre, actions, conversations, sentiment, location, and the like, and may include weighted vector representations of the features associated with the content items. According to aspects of the present disclosure, the content items may be segmented, and the characteristic information may be obtained for each segmented portion of each content item.

A content graph of the content items may then be generated based on the characteristic information associated with each content item and/or segment of each content item. For example, the graph may include nodes and edges that represent relationships and/or associations between the various content items, segments of the content items, and/or the characteristic information. Based on the content graph, one or more discovery maps/decision trees may be generated that may be utilized to facilitate providing guided recommendations of content based on user feedback and/or interactions. The discovery maps/decision trees may include content items and/or segments of content items that are arranged and connected in the discovery maps/decision trees based on their associated characteristic information to facilitate guided recommendations of content based on user interactions.

According to exemplary implementations of the present disclosure, the discovery map/decision tree may be configured to facilitate guided recommendations starting from any content item and/or content item segment included in the content graph and may include a plurality of decision nodes corresponding to content items and/or content item segments from the content graph. For example, each discovery map/decision tree may include a plurality of decision nodes corresponding to one or more content items and/or content item segments of the content graph. Each decision node may be connected, in the discovery map/decision tree, to two or more decision nodes that may correspond to additional content items and/or content item segments, and so forth. The connection between decision nodes may be based on the characteristic information associated with the content item and/or content item segments. In certain exemplary implementations, the connected content items and/or content item segments may include content items and/or content item segments that include characteristic information that is similar to characteristic information associated with the previous node and content items and/or content item segments that include characteristic information that is dissimilar to characteristic information associated with the previous node.

In exemplary implementations, the discovery map/decision tree may be utilized in serving guided recommendations to a user. For example, at a particular decision node of the discovery map/decision tree, a content item and/or content item segment associated with the decision node may be presented to a user. According to certain aspects of the present disclosure, a content item may include a sequence of multiple content item segments. A user may respond favorably or unfavorably to the presented content item and/or content item segment. Based on the user's response, the discovery map/decision tree may be traversed to a subsequent decision node, and a content item and/or content item segment associated with the subsequent decision node may be presented to the user. The user may again respond (e.g., favorably or unfavorably) to the presented content item and/or content item segment(s), which may be used to traverse the discovery map/decision tree to the next decision node, and so forth. Iteratively presenting content items and/or content item segments associated with further decision nodes of the discovery map/decision tree and receiving user responses may be performed until the user selects a content item and/or content item segment to consume.

Advantageously, the exemplary embodiments of the present disclosure can facilitate a guided recommendation system that can efficiently and effectively recommend content to a user based on current responses provided by the user. Accordingly, unlike existing systems, which typically rely on longform information such as user history and can have difficulty recommending content based on a user's current preferences rather than historical activity over a longer period, exemplary embodiments of the present disclosure can capture the user's current preferences and recommend content based on the current preferences of the user. For example, if a particular user has primarily watched sports content for years and one day wants to watch a romantic comedy, current systems will have difficulty providing romantic comedy recommendations to the user based on the user's history. In contrast, exemplary embodiments of the present disclosure can efficiently and effectively recommend content based on user responses to presented content items and/or content item segments.

Further, while the exemplary embodiments discussed herein are primarily described with respect to video content, such as television shows and movies, exemplary embodiments of the present disclosure can be applicable to any other types of content. For example, exemplary embodiments of the present disclosure can be applicable to music, books, audio books, articles, papers, documents, other video content, and the like.

FIG. 1 is an illustration of an exemplary computing environment 100, according to exemplary embodiments of the present disclosure.

As shown in FIG. 1, computing environment 100 may include one or more client devices 110, also referred to as user devices, for connecting over network 150 to access computing resources 120. Client device 110 may include any type of computing device, such as a smartphone, tablet, laptop computer, desktop computer, wearable, etc., and may include one or more processors 112 and one or more memory 114, which may store one or more applications, such as application 115. Network 150 may include any wired or wireless network (e.g., the Internet, cellular, satellite, Bluetooth, Wi-Fi, etc.) that can facilitate communications between client device 110 and computing resources 120. Computing resources 120 may include one or more processors 122 and one or more memory 124, which may store one or more applications, such as content recommendation service 125, that may be executed by processor(s) 122 to cause the processor(s) 122 of computing resources 120 to perform various functions and/or actions. According to exemplary embodiments of the present disclosure, content recommendation service 125 may be provided and employed in connection with a content library, a content streaming service, a content provider, and the like.

According to aspects of the present disclosure, computing resources 120 may represent at least a portion of a networked computing system that may be configured to provide online applications, services, computing platforms, servers, and the like, that may be configured to execute on a networked computing system. In exemplary implementations of the present disclosure, computing resources 120 may be representative of computing resources that may form a portion of a larger networked computing platform (e.g., a cloud computing platform, and the like), which may be accessed by client device 110. Computing resources 120 may provide various services and/or resources and do not require end-user knowledge of the physical premises and configuration of the system that delivers the services. For example, computing resources 120 may include "cloud computing platforms," "on-demand computing platforms," "software as a service (SaaS)," "infrastructure as a service (IaaS)," "platform as a service (PaaS)," "platform computing," "network-accessible platforms," "data centers," "virtual computing platforms," and so forth. Example components of a remote computing resource, which may be used to implement computing resources 120, are discussed below with respect to FIG. 8.

Further, as shown in FIG. 1, computing resources 120 may communicate with one or more datastore(s), such as content item datastore 130 and user datastore 132. Content item datastore 130 may be configured to store and maintain a corpus of content items (e.g., television shows, movies, music, books, articles, videos, etc.), segments of content items (e.g., individual shots of a video content item, individual scenes of a video content item, other segments of video content items, snippets of a song, passages of a book and/or audio book, and the like), which may be provided to and utilized by content recommendation service 125 in connection with recommending content. According to certain aspects of the present disclosure, content item datastore 130 may also be configured to store and maintain characteristic information associated with the stored content items and/or content item segments. Further, the stored content items and/or content item segments may be stored and maintained as a content graph, a discovery map/decision tree, and the like. User datastore 132 may be configured to store and maintain information associated with a corpus of users, such as user profiles, user history, user likes, user dislikes, etc.

As illustrated in FIG. 1 client device 110 may access and/or interact with content recommendation service 125 through network 150 via one or more applications 115 operating and/or executing on client device 110. For example, a user associated with client device 110 may launch and/or execute such an application on client device 110 to access and/or interact with applications and/or services (e.g., content provider service, content streaming source, content storefront, etc.) executing on computing resources 120 via network 150. According to aspects of the present disclosure, a user may, via execution of application 115 on client device 110, access or log into services executing on computing resources 120 by submitting one or more credentials (e.g., username/password, biometrics, secure token, etc.) through a user interface presented on client devices 110.

Once logged into services executing on remote computing resources 120, such as content recommendation service 125, a user associated with client device 110 may be presented with content items and/or content item segments that may be accessed, viewed, downloaded, or otherwise consumed by the user. According to exemplary implementations of the present disclosure, the user may be presented with content recommendations determined by content recommendation service 125. For example, rather than simply provide a carousel of content that a user can scroll through to select a content item, exemplary embodiments of the present disclosure can provide an actively guided recommendation service that can facilitate recommendation of content to the user.

According to exemplary embodiments of the present disclosure, the content items and/or content item segments included in a corpus of content items (e.g., stored and maintained by content item datastore 130, etc.) may have been processed (e.g., by one or more trained machine learning models, etc.) to obtain various characteristic information associated with each content item and/or content item segment. In an exemplary implementation where the content items include video content items, such as movies, television shows, and the like, and the content item segments include scenes, shots, etc. of the movies, television shows, and the like, the characteristic information may include information related to features of the content item and/or content item segment, such as a location of the shot, a time period of the content shot, a mood of the shot, a topic of the shot, cast appearing in the shot, dialogue in the shot, costumes used in the shot, action sequences appearing in the shot, music/soundtrack played during the shot, colors present in the shot, aesthetics, styles, genre, and the like. According to aspects of the present disclosure, the characteristic information may be encoded as a vector representation (e.g., embedding, feature vector, etc.) of various features of the content item and/or content item segment and/or may also include weights for each feature that may represent the prominence, dominance, strength, etc. of each respective feature in the corresponding content item and/or content item segment.

The characteristic information may be used to generate a content graph that may organize the content items and/or content item segments based on the characteristic information. For example, content items and/or content item segments having common characteristic features may be connected via an edge of the graph, and a length of the edge connecting the content items and/or content item segments may represent a strength of the connection. Alternatively and/or in addition, the content items and/or content item segments may be stored and maintained in a graph having other configurations, a database, other data structure, and the like.

According to exemplary embodiments of the present disclosure, one or more discovery maps/decision trees may be generated based on the content items and/or content item segments and the characteristic information (including the weights for each feature indicated by the characteristic information) associated with each content item and/or content item segment. The generated discovery map/decision tree may include all the content items and/or content item segments or less than all the content items and/or content item segments. In exemplary implementations, the generated discovery map/decision tree may include a plurality of decision nodes, where each node is associated with corresponding content items and/or content item segments. Each decision node may be connected to two or more subsequent decision nodes, which may be associated with further corresponding content items and/or content item segments. In an exemplary implementation, the discovery map/decision tree may be generated such that each decision node is connected to a first subsequent decision node that is associated with content items and/or content item segments having similar characteristic information as content items and/or content item segments associated with the previous decision node to which it is connected and a second subsequent decision node that is associated with content items and/or content item segments having dissimilar characteristic information as content items and/or content item segments associated with the previous decision node to which it is connected.

Accordingly, as the discovery map/decision tree is employed to provide an actively guided content recommendation service, a user may be presented with a content item and/or one or more content item segments associated with a decision node, and based on the user's response to the presented content item and/or one or more content item segments, the discovery map/decision tree may be traversed to a second decision node and presented with a content item and/or one or more content item segments associated with the second decision node. According to certain aspects of the present disclosure, a sequence of content item segments may be presented to the user based on the user response and the previously presented content item and/or one or more content item segments. The traversal of the discovery map/decision tree may be continued until a user selects a presented content item and/or content item segment. According to certain aspects of the present disclosure, the discovery map/decision tree may be pre-computed.

In exemplary implementations where the discovery map/decision tree is generated with content item segments, the content item segments associated with the various decision nodes of the discovery map/decision tree may be selected to ensure that the content item segment is representative of the entirety of the content item from which the content item segment was obtained. For example, in an exemplary implementation where shots of an action movie are being selected for inclusion in a discovery map/decision tree, shots that include action sequences may be more representative of the movie and therefore selected for inclusion in the discovery map/decision tree over scenes that lack action sequences. Accordingly, this may be performed, for example, by aggregating the characteristic information associated with all the shots (e.g., content item segments) obtained from a single movie (e.g., content item) to determine the prominent and/or dominant characteristics of the movie. Then, the shots that include characteristic information more closely aligned with the prominent and/or dominant characteristics of the movie may be selected for inclusion in the discovery map/decision tree as representative of the movie.

In exemplary implementations of the present disclosure, the discovery map/decision tree may be stored and maintained in content item datastore 130 and accessed by content recommendation service 125 to provide actively guided recommendations of content to a user associated with client device 110. For example, content recommendation service 125 may recommend content in connection with a user of client device 110 accessing a content provider (e.g., a content storefront, a streaming content provider, a content library, and the like). Accordingly, when the user of client device 110 first accesses the content provider, content recommendation service 125 may receive certain initial information in connection with the user, such as user inputs and/or user profile information. For example, the user may specify certain information regarding the content that the user is seeking (e.g., genre, cast, mood, length, etc.). Alternatively and/or in addition, content recommendation service 125 may obtain a user profile, which may include information such as previous content accessed and consumed by the user, user likes, user dislikes, user preferences, and the like.

Based on the initial information, content recommendation service 125 may identify an initial content item and/or content item segment for presentation to the user. The initial content item and/or content item segment may be associated with a decision node of the discovery map/decision tree. The decision node associated with the initial content item and/or one or more content item segments may be a decision node of the discovery map/decision tree. Accordingly, content recommendation service 125 may cause the initial content item and/or one or more content item segments to be presented, via a user interface, on client device 110. Further, the user interface presenting the initial content item and/or one or more content item segments may include user response controls to allow a user to respond (e.g., either positively or negatively) to the presented content item and/or content item segment. Accordingly, in response to presentation of the initial content item and/or one or more content item segments, the user may select the initial content item and/or one or more content item segments to access and/or otherwise consume the initial content item (or the content item with which the one or more content item segments are associated) or interact with the user response controls to indicate whether or not the user liked or disliked the initial content item and/or one or more content item segments.

For example, the user response controls may include a positive response control, such as a like button, a thumbs up button, a positive swipe control (e.g., swipe to the right, etc.), and the like, as well as a negative response control, such as a dislike button, a thumbs down button, a negative swipe control (e.g., swipe to the left, etc.), and the like. Accordingly, during or after presentation of the initial content item and/or one or more content item segments, a user may interact with the user response controls to indicate a positive or negative response to the presented content and/or one or more content item segments. For example, a user may interact with a thumbs up button, a like button, and/or swipe right of the user response control to indicate that he or she enjoyed the content item and/or one or more content item segments. Alternatively, the user may interact with a thumbs down button, a dislike button, and/or swipe left of the user response control to indicate that he or she did not enjoy the content item and/or one or more content item segments. Based on the user's interactions with the user response controls and the characteristic information associated with the presented content item and/or one or more content item segments, content recommendation service 125 may traverse the discovery map/decision tree to a next decision node and determine a next content item and/or one or more content item segments associated with the next decision node to present to the user on client device 110.

In an exemplary implementation where the user responded positively to the initial content item and/or content item segment (e.g., via an interaction with a user interface presented on client device 110), content recommendation service 125 may traverse the discovery map/decision tree to a positive response decision node connected to the decision node associated with the initial content item and/or one or more content item segments. The positive response decision node may be associated with one or more content items and/or content item segments, from which the next content item and/or one or more content item segments may be selected. In exemplary implementations, the content items and/or content item segments associated with the positive decision node may include content items and/or content item segments having characteristic information similar to the characteristic information associated with the initial content item and/or content item segment.

Conversely, in an exemplary implementation where the user responded negatively to the initial content item and/or content item segment (e.g., via an interaction with a user interface presented on client device 110), content recommendation service 125 may traverse the discovery map/decision tree to a negative response decision node connected to the decision node associated with the initial content item and/or content item segment. The negative response decision node may be associated with one or more content items and/or content item segments, from which the next content item and/or content item segment may be selected. In exemplary implementations, the content items and/or content item segments associated with the negative decision node may include content items and/or content item segments having characteristic information dissimilar to the characteristic information associated with the initial content item and/or content item segment.

In an example implementation, content recommendation service 125 may select a movie segment (extracted from a movie) associated with an initial decision node of the discovery map/decision tree that includes characteristic information indicating that the highest weighted features of the segment include an action theme, a car chase, and a shootout. If the user responds positively to the movie segment (e.g., via an interaction with a user interface presented on client device 110), content recommendation service 125 may traverse the discovery map/decision tree to the positive response decision node connected to the initial decision node and identify a subsequent movie segment associated with the positive response decision node to present to the user on client device 125 in view of the user's positive reaction to the previous movie segment. The subsequent movie segment may be selected based on the characteristic information, and corresponding weights, associated with the previous movie segment, as well the characteristic information, and corresponding weights, associated with the movie segments from which the next movie segment is being selected may be considered. Accordingly, the movie segments associated with the positive response decision node may include characteristic information that is similar to the characteristic information associated with the previous movie segment. For example, the characteristic information associated with the previous movie segment (e.g., action theme, car chase, shootout) may be labeled as positive characteristic information associated with the user. Accordingly, based on the positive characteristic information and the user's positive response, a plurality of characteristic information may be determined to be included in a subsequent movie segment to be presented to the user. Continuing the above example, based on the positive characteristic information and the user's positive response, characteristic information indicating that the highest weighted features of the segment include an action theme, a military battle, a shootout, a car chase, and a dramatic conversation may be determined to be included in a subsequent movie segment to presented to the user on client device 110. In an exemplary implementation where no single movie segment includes all the characteristic information that was determined to be included in the subsequent movie segment to be presented to the user on client device 110, a sequence of movie segments (from a single movie) may be generated such that the sequence of movie segments includes all of the determined characteristic information. Continuing the above example where it was determined that the subsequent movie segment should include an action theme, a military battle, a shootout, a car chase, and a dramatic conversation, but no single movie segment includes all of an action theme, a military battle, a shootout, a car chase, and a dramatic conversation, a first movie segment including characteristic information indicative of an action theme, a military battle, and a shootout may be combined with a second movie segment including characteristic information indicative of a car chase and a dramatic conversation, and the sequence of the first and second movie segments may be presented to the user on client device 110 as the subsequent movie segment.

Continuing the example, a user may respond negatively to the subsequently presented movie segment (e.g., via an interaction with a user interface presented on client device 110), content recommendation service 125 may continue to traverse the discovery map/decision tree to the negative response decision node connected to the decision node and identify a subsequent movie segment associated with the negative response decision node to present to the user on client device 125 in view of the user's negative reaction to the previous movie segment. Accordingly, the movie segments associated with the negative response decision node may include characteristic information that is dissimilar to the characteristic information (e.g., with respect to at least one characteristic information feature) associated with the previous movie segment. According to an aspect of the present disclosure, content recommendation service 125 may process the characteristic information of the current movie segment against the characteristic information associated with the previous movie segment to differentiate the characteristic information features to which the user responded positively and the characteristic information features to which the user responded negatively. Accordingly, continuing the above example, content recommendation service 125 may determine that the user may be responding negatively to the military battle and the dramatic conversation, and may select the next subsequent movie segment in view of the positive characteristic information and the negative characteristic information. For example, a further plurality of characteristic information may be determined to be included in a subsequent movie segment to be presented to the user based on the characteristic information to which the user responded positively and the characteristic information to which the user responded negatively. According to certain aspects of the present disclosure, content recommendation service 125 may select a movie segment having characteristic information that includes one of the negative characteristic information features (e.g., military battle or dramatic conversation) to determine which feature is disliked by the user. Accordingly, another subsequent movie segment may be selected and presented, based on the characteristic information, to the user on client device 110, and this process may be repeated until the user selects a presented movie segment to view, watch, and/or otherwise consume the movie with which the movie segment is associated. In an exemplary implementation where no single movie segment includes all the further characteristic information that was determined to be included in the subsequent movie segment to be presented to the user on client device 110, a sequence of movie segments (from a single movie) may be generated such that the sequence of movie segments includes all of the determined further characteristic information.

Figure 2:
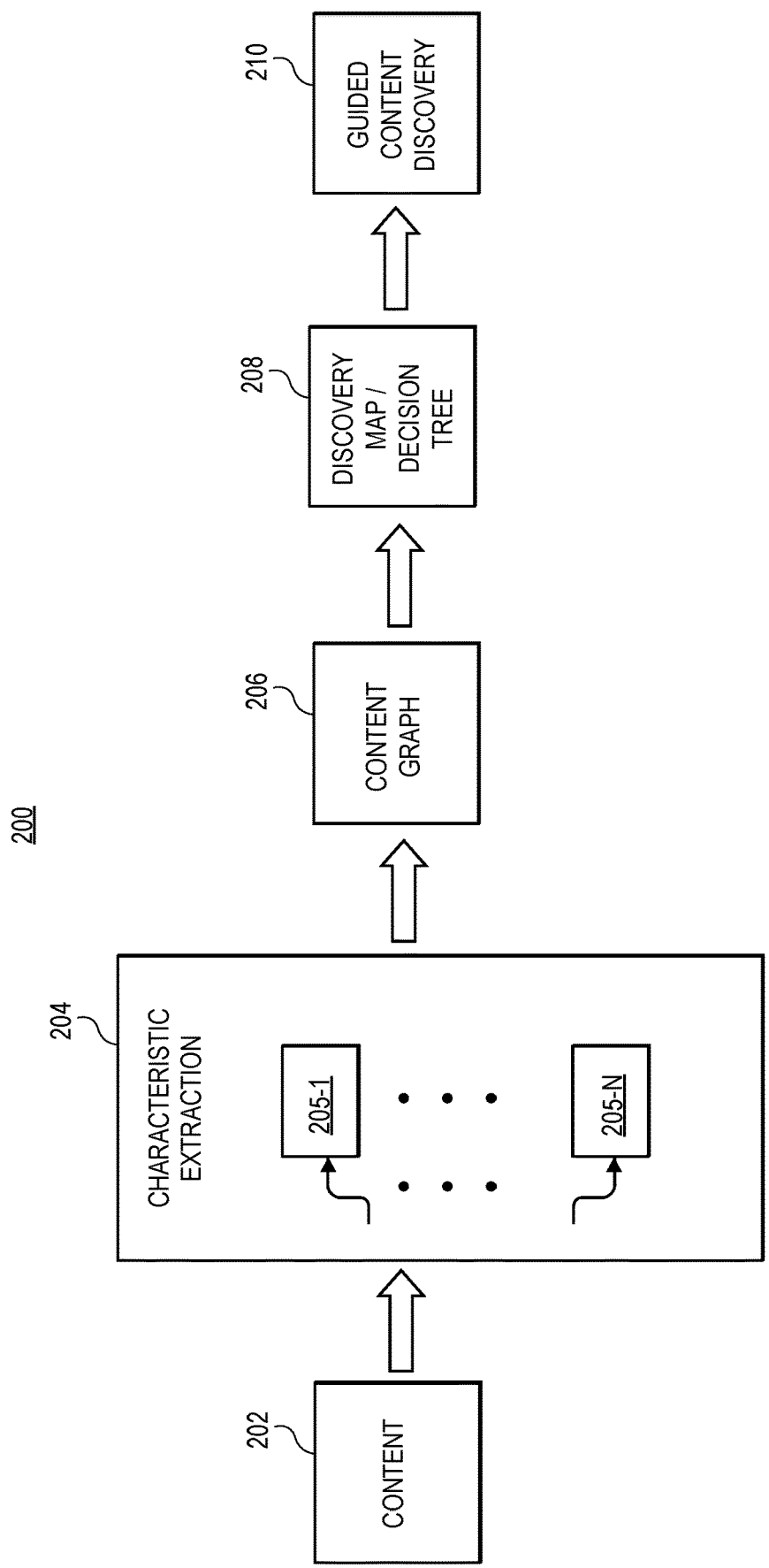
FIG. 2 is a block diagram illustrating an exemplary process flow, according to exemplary embodiments of the present disclosure.

FIG. 2 is a block diagram illustrating an exemplary process flow 200, according to exemplary embodiments of the present disclosure.

As shown in FIG. 2, content 202 may be processed by characteristic extraction block 204 to obtain characteristic information regarding features of content 202. According to exemplary embodiments of the present disclosure, content 202 may represent a corpus of content items and can include content items and/or content item segments (e.g., stored and maintained by content item datastore 130, etc.). The content items may include video content items, such as movies, television shows, and the like, the content item segments may include scenes, shots, clips, etc. of the movies, television shows, and the like, and the characteristic information may include information related to features of the content item and/or content item segment, such as a location of the shot, a time period of the content shot, a mood of the shot, a topic of the shot, cast appearing in the shot, dialogue in the shot, costumes used in the shot, action sequences appearing in the shot, music/soundtrack played during the shot, colors present in the shot, and the like. According to aspects of the present disclosure, characteristic extraction block 204 may include one or more machine learning models 205 (e.g., 205-1 through 205-N) that may have been trained to extract characteristic information from content 202. In exemplary implementations, the extracted characteristic information may be encoded as vector representations (e.g., embeddings, feature vectors, etc.) of each feature included in content 202. Further, the extracted characteristic information may also include weights for each feature that may represent the prominence, dominance, strength, etc. of each respective feature in content 202.

As illustrated in FIG. 2, the characteristic information extracted by characteristic extraction block 204 can be used to generate content graph 206. Content graph 206 may store and maintain content 202 in an organization based on the characteristic information. For example, content items and/or content item segments having common characteristic features may be connected via an edge of the graph, and a length of the edge connecting the content items and/or content item segments may represent a weight and/or strength of the connection. Alternatively and/or in addition, content graph 206 may organize content items and/or content item segments by connecting the content items and/or content item segments according to their characteristic features, and the distance to the features may represent a weight, strength, prominence, and/or dominance of the feature. Content graph 206 may organize and maintain content items and/or content item segments in other configurations, such as a database, other data structure, and the like. Further, content graph 206 may be configured to be continuously updated and expanded as new content may be added to content graph 206.

According to exemplary embodiments of the present disclosure, one or more discovery maps/decision trees 208 may be generated based on the content items and/or content item segments and the characteristic information (including the weights for each feature indicated by the characteristic information) associated with each content item and/or content item segment. In exemplary implementations, discovery map/decision tree 208 may include a plurality of decision nodes, where each node is associated with corresponding content items and/or content item segments. Each decision node may be connected to two or more subsequent decision nodes (e.g., a positive response decision node and a negative response decision node), which may be associated with further corresponding content items and/or content item segments. In an exemplary implementation, the discovery map/decision tree may be generated such that each decision node is connected to a first subsequent decision node (e.g., the positive response decision node) that is associated with content items and/or content item segments having similar characteristic information as content items and/or content item segments associated with the previous decision node to which it is connected and a second subsequent decision node (e.g., the negative response decision node) that is associated with content items and/or content item segments having dissimilar characteristic information as content items and/or content item segments associated with the previous decision node to which it is connected. According to certain aspects of the present disclosure, discovery map/decision tree 208 may map all the content items and/or content item segments included in content 202 and/or content graph 206.

After generation of discovery map/decision tree 208, guided content discovery 210 may be provided, according to exemplary embodiments of the present disclosure. For example, in utilizing discovery map/decision tree 208 to provide an actively guided content discovery and/or recommendation service, a user may be presented with a content item and/or content item segment associated with an initial decision node of discovery map/decision tree 208, and based on the user's response to the presented content item and/or content item segment, discovery map/decision tree 208 may be traversed to a second decision node, and the user may be presented with a second content item and/or content item segment associated with the second decision node of discovery map/decision tree 208. The user may again respond to the second content item and/or content item segment, and discovery map/decision tree 208 may be traversed to a third decision node, and the user may be presented with a third content item and/or content item segment associated with the third decision node of discovery map/decision tree 208. The presentation of content items and/or content item segments and receipt of user responses may be iteratively continued until a user selects a presented content item and/or content item segment to view, access, or otherwise consume the presented content item and/or content item segment.

Figure 3:
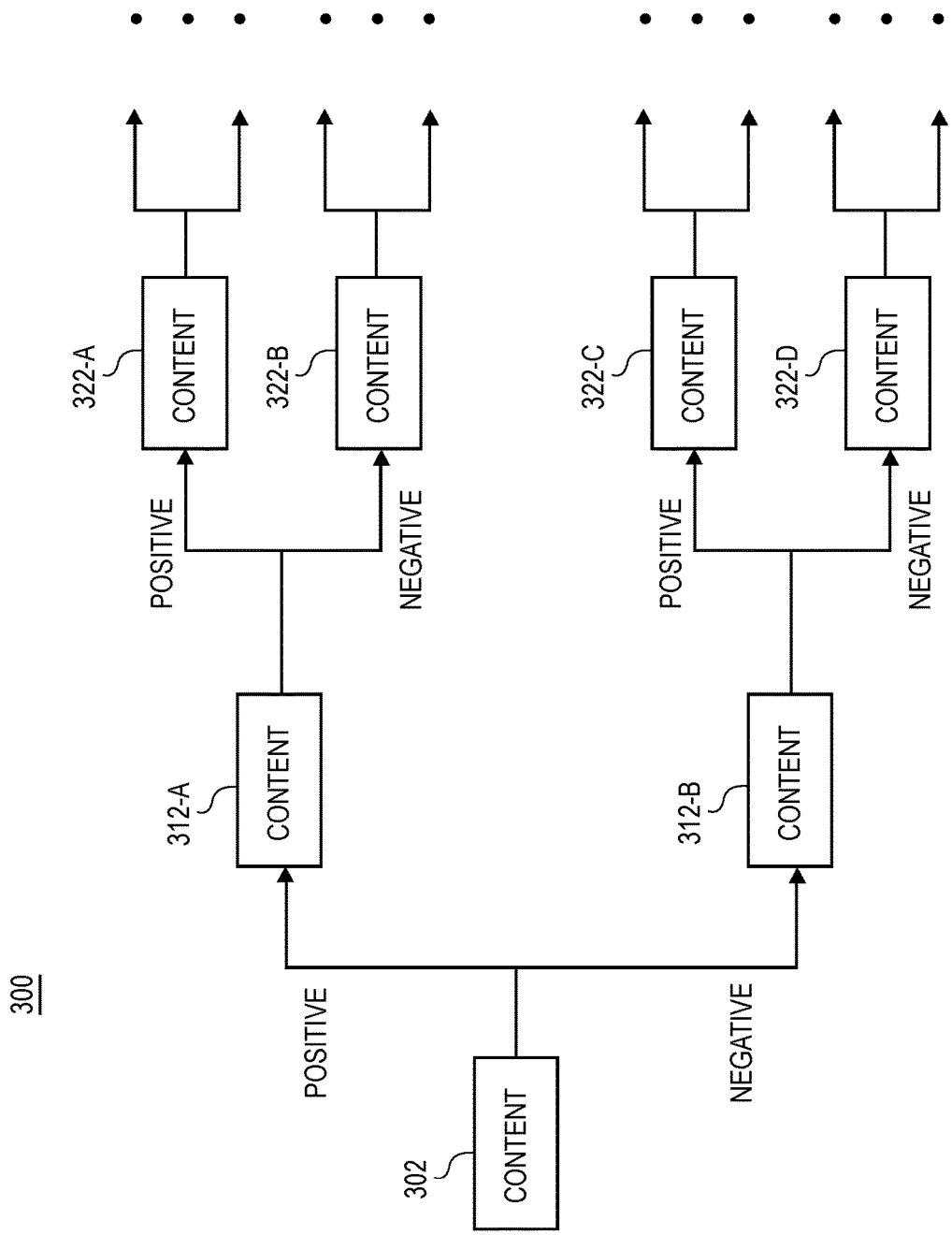
FIG. 3 is an illustration of an exemplary decision map and/or decision tree, according to exemplary embodiments of the present disclosure.

FIG. 3 is an illustration of an exemplary decision map and/or decision tree 300, according to exemplary embodiments of the present disclosure.

As shown in FIG. 3, discovery map/decision tree 300 may include a plurality of decision nodes (e.g., decision nodes 302, 312-A, 312-B, 322-A, 322-B, 322-C, 322-D, etc.), and each node may be associated with one or more content items and/or content item segments. Discovery map/decision tree 300 may form a portion of a larger discovery map/decision tree and may include different configurations (e.g., more than two decision nodes connected to each parent node, etc.).

According to exemplary embodiments of the present disclosure, discovery map/decision tree 300 may be generated based on content items and/or content item segments and their associated characteristic information to facilitate guided content recommendations based on user responses to the various content items and/or content item segments that are presented to the user. As illustrated, each decision node of discovery map/decision tree 300 may be connected to a positive response decision node (e.g., decision nodes 312-A, 322-A, and 322-C) and a negative respond decision node (e.g., decision nodes 312-B, 322-B, and 322-D). Accordingly, in generating discovery map/decision tree 300, the content items and/or content item segments associated with the positive response decision nodes include characteristic information that is similar to the content items and/or content item segments associated with the preceding decision node and the content items and/or content item segments associated with the negative response decision nodes include characteristic information that is dissimilar to the content items and/or content item segments associated with the preceding decision node. For example, the content items and/or content item segments associated decision node 312-A may have characteristic information that is similar to content items and/or content item segments associated with decision node 302, the content items and/or content item segments associated decision node 312-B may have characteristic information that is dissimilar to content items and/or content item segments associated with decision node 302, the content items and/or content item segments associated decision node 322-A may have characteristic information that is similar to content items and/or content item segments associated with decision node 312-A, the content items and/or content item segments associated decision node 322-B may have characteristic information that is dissimilar to content items and/or content item segments associated with decision node 312-A, the content items and/or content item segments associated decision node 322-C may have characteristic information that is similar to content items and/or content item segments associated with decision node 312-B, and the content items and/or content item segments associated decision node 322-D may have characteristic information that is dissimilar to content items and/or content item segments associated with decision node 312-B.

In one exemplary implementation, in generating discovery map/decision tree 300, the content items and/or content item segments associated with each node may be determined on the strongest and/or most prominent/dominant (e.g., greatest weighted) features indicated by the characteristic information associated with each content item and/or content item segments. For example, a threshold number (e.g., the top 2, 3, 5, 10, 15, 20, 25, etc. features) of the strongest and/or most prominent/dominant (e.g., greatest weighted) features may be considered in determining the content items and/or content item segments. For example, if the characteristic information associated with a content item and/or content item segment associated with decision node 302 indicates that greatest weighted features of the content item and/or content item segment includes an action sequence, a shootout, a car chase, dramatic dialogue, and ominous music, content items and/or content item segments selected to be associated with decision node 312-A may include characteristic information that indicates that at least one or more of an action sequence, a shootout, a car chase, dramatic dialogue, and ominous music is among the highest weighted features of the content item and/or content item segment. According to aspects of the present disclosure, in implementations where no single content item and/or content item segment includes all the desired greatest weighted features, a sequence of content item segments (from a single content item) may be generated such that the sequence of content item segments includes all of the desired greatest weighted features.

Conversely, content items and/or content item segments selected to be associated with decision node 312-B may include characteristic information that indicates that none of an action sequence, a shootout, a car chase, dramatic dialogue, and ominous music is among the highest weighted features of the content item and/or content item segment. According to aspects of the present disclosure, in implementations where no single content item and/or content item segment includes all the desired features, a sequence of content item segments (from a single content item) may be generated such that the sequence of content item segments includes all of the desired features. Accordingly, content items and/or content item segments may be selected for a particular node of discovery map/decision tree 300 based on the features indicated by the characteristic information associated with the content items and/or content item segments from which the content items and/or content item segments are being selected and the features indicated by the characteristic information associated with the content items and/or content item segments of the preceding decision node.

Further, in exemplary implementations where discovery map/decision tree 300 is generated with content item segments, the content item segments associated with the various decision nodes of discovery map/decision tree 300 may be selected to ensure that the content item segment is representative of the entirety of the content item from which the content item segment was obtained. For example, in an exemplary implementation where shots of an action movie are being selected for inclusion in discovery map/decision tree 300, shots that include action sequences may be more representative of the movie and therefore more likely to be selected for inclusion in discovery map/decision tree 300 over scenes that lack action sequences. Accordingly, this may be performed, for example, by aggregating the characteristic information associated with all the shots (e.g., content item segments) obtained from a single movie (e.g., content item) to determine the prominent and/or dominant characteristics of the movie. Then, the shots that include characteristic information more closely aligned with the prominent and/or dominant characteristics of the entire movie may be selected for inclusion in discovery map/decision tree 300 as representative of the movie.

In serving guided content recommendations utilizing discovery map/decision tree 300, a user may be presented a content item and/or content item segment associated with decision node 302. Based on the user's response to the presented content item and/or content item segment (e.g., positive or negative), discovery map/decision tree 300 may be traversed to decision node 312-A or decision node 312-B, and a content item and/or content item segment associated with decision node 312-A or 312-B may be presented to the user, and a further response may be received from the user in connection with the subsequently presented content item and/or content item segment, which will dictate the further traversal of discovery map/decision tree 300. Accordingly, the presentation of content items and/or content item segments, the receiving of the user's response to the presented content, and traversal of discovery map/decision tree 300 may be iteratively continued until the user selects a content item and/or content item segment to access, view, or otherwise consume the content item. For example, starting from decision node 302, if a user responds positively to a content item and/or content item segment associated with decision node 302, discovery map/decision tree 300 may be traversed to positive decision node 312-A, whereas if the user responds negatively to the content item and/or content item segment associated with decision node 302, discovery map/decision tree 300 may be traversed to negative decision node 312-B. From decision node 312-A or decision node 312-B, the user may be presented with a content item and/or content item segment associated with either decision node 312-A or 312-B, a user response may be received in connection with the presented content item, and discovery map/decision tree 300 may continue to be traversed to the next corresponding node.

Further, as discovery map/decision tree 300 is traversed, content items and/or content item segments associated with each node may be selected based on the weighted features indicated by the characteristic information associated with content items and/or content item segments of the current decision node, the features indicated by the characteristic information associated with the content items and/or content item segments that were presented in connection with the prior decision nodes, and the user's response to the content item and/or content item segment presented in connection with the prior decision nodes. For example, in an exemplary traversal of discovery map/decision tree 300 (e.g., in connection with providing guided recommendation of content) where the current node is decision node 322-B, a content item and/or content item segment associated with decision node 322-B may be selected based on the features indicated by the characteristic information associated with content items and/or content item segments associated with decision node 322-B, the features indicated by the characteristic information associated with content item and/or content item segment presented in connection with decision node 312-A, the user's negative response to the content item and/or content item segment presented in connection with decision node 312-A, the features indicated by the characteristic information associated with content item and/or content item segment presented in connection with decision node 302, and the user's positive response to the content item and/or content item segment presented in connection with decision node 302.

For example, if the content item and/or content item segment presented in connection with decision node 302 included dominant (e.g., most heavily weighted) Features A, B, C, D, and E, the content item and/or content item segment presented in connection with decision node 312-A may include dominant (e.g., most heavily weighted) Features A, B, C, F, and G. Accordingly, since the user responded positively to a content item and/or content item segment having dominant Features A, B, C, D, and E and negatively to a content item and/or content item segment having dominant Features A, B, C, F, and G, it may be determined that the user enjoyed Features A, B, C, D, and E but did not enjoy Features F and G. Accordingly, in connection with node 322-B, a content item and/or content item segment having dominant Features A, B, C, D, H, and I may be selected to be presented to the user. Accordingly, the features may be considered in view of their respective weights (e.g., features with higher weights may be prioritized over lower weighted features) and features that are below a threshold weight may not be considered in determining the next content item and/or content item segment. The selection of content items and/or content item segments based on the presented content items and/or content item segments and the user's responses in connection with previous decision nodes may be iteratively repeated until the user selects a content item for viewing, accessing, or otherwise consuming. According to aspects of the present disclosure, in connection with any decision node 302, 312, and/or 322, in implementations where no single content item and/or content item segment includes all the Features that are to be presented to the user, a sequence of content item segments (from a single content item) may be generated, such that the sequence of content segments includes all of the desired Features. For example, in the above example in connection with node 322-B, if no single content item and/or content item segment includes Features A, B, C, D, H, and I, a first content item segment including features A, B, C, and D may be combined with a second content item segment including Features H and I to generate a sequence of segments including the first content item segment and the second content items which may be presented to the user.

Figure 4:
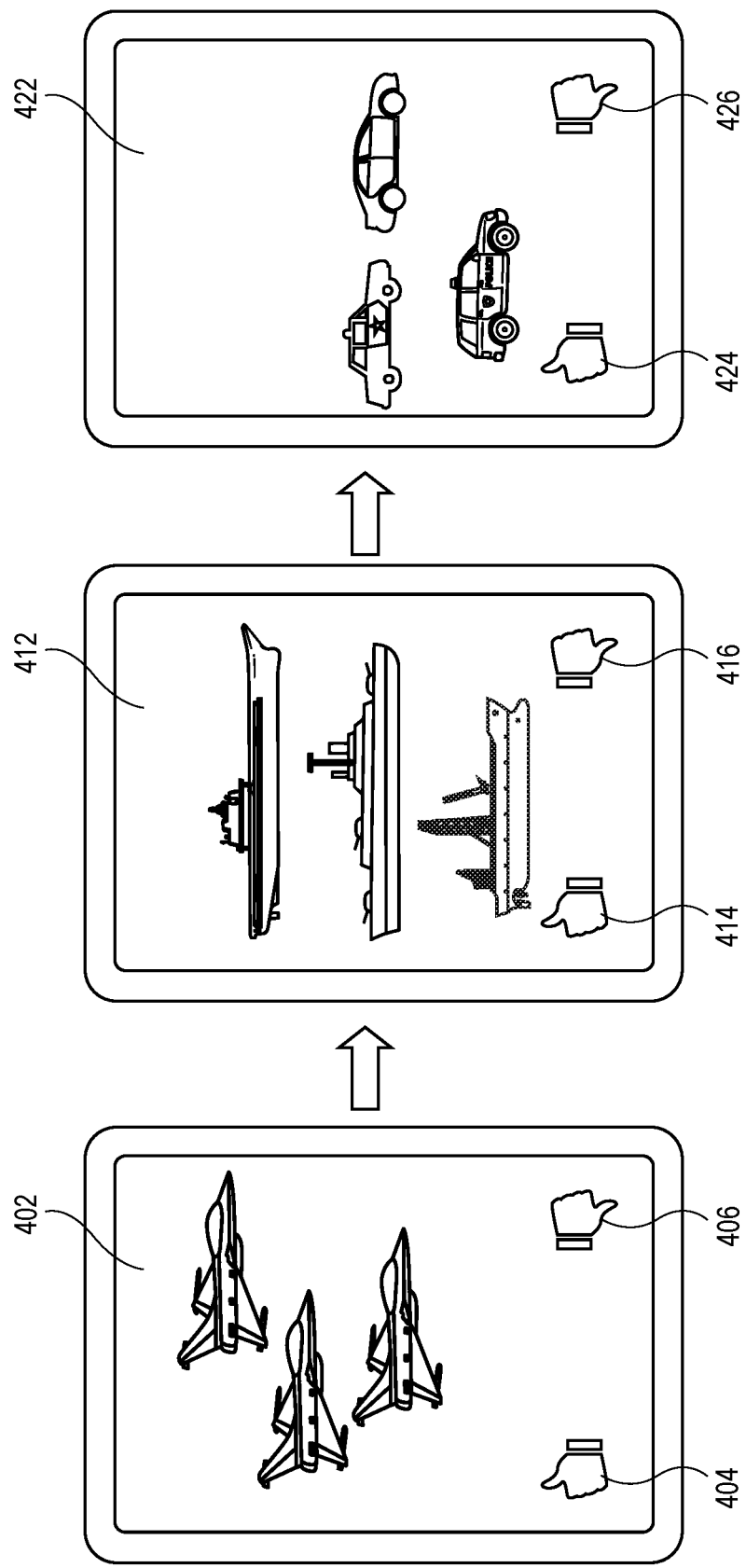
FIG. 4 is an illustration of exemplary user interfaces that may be presented in connection with a guided content recommendation service, in accordance with exemplary embodiments of the present disclosure.

FIG. 4 is an illustration of exemplary user interfaces 402, 412, and 422 that may be presented in connection with a guided content recommendation service, in accordance with exemplary embodiments of the present disclosure. In exemplary implementations, user interfaces 402, 412, and 422 may be presented to a user as a guided content recommendation service in connection with a content provider, such as a content streaming service, a content library, a content storefront, and the like.

As shown in FIG. 4, in connection with a user accessing a content provider, the user may be presented with user interfaces 402, 412, and 422 as a guided content recommendation service. For example, the user may first be presented with a content item segment via user interface 402. According to exemplary embodiments of the present disclosure, the content item and/or content item segment presented via user interface 402 may correspond to a first decision node of a discovery map/decision tree and may include characteristic information regarding features of the content item and/or content item segment, such as information regarding the plot, the fighter jets, the music, the mood, the cast, and the like. Further, user interface 402 may include user response controls 404 and 406. Interaction with user response control 404 may indicate a positive response from the user to the presented content item and/or content item segment, and interaction with user response control 406 may indicate a negative response from the user to the presented content item and/or content item segment.

Based on the user response to the content item and/or content item segment presented in user interface 402 and the characteristic information associated with the content item and/or content item segment, the user may be presented with a subsequent content item and/or content item segment via user interface 412. According to exemplary embodiments of the present disclosure, in connection with the guided content recommendation, the discovery map/decision tree may have been traversed from the first decision node to a second decision node based on whether the user responded positively or negatively to the presented content item and/or content item segment. Accordingly, the content item and/or content item segment presented via user interface 412 may correspond to the second decision node of the discovery map/decision tree and may include characteristic information regarding features of the content item and/or content item segment, such as information regarding the plot, the ships, the music, the mood, the cast, and the like. Further, similar to user interface 402, user interface 412 may also include user response controls 414 and 416. Interaction with user response control 414 may indicate a positive response from the user to the presented content item and/or content item segment, and interaction with user response control 416 may indicate a negative response from the user to the presented content item and/or content item segment.

Based on the user responses to the content item and/or content item segment presented in user interfaces 402 and 412 and the characteristic information associated with the presented content items and/or content item segments, the user may be presented with yet another subsequent content item and/or content item segment via user interface 422. According to exemplary embodiments of the present disclosure, in connection with the guided content recommendation, the discovery map/decision tree may have been traversed from the second decision node to a third decision node based on whether the user responded positively or negatively to the presented content item and/or content item segment. Accordingly, the content item and/or content item segment presented via user interface 422 may correspond to the third decision node of the discovery map/decision tree and may include characteristic information regarding features of the content item and/or content item segment, such as information regarding the plot, the cars, the music, the mood, the cast, and the like. Further, similar to user interfaces 402 and 412, user interface 422 may also include user response controls 424 and 426. Interaction with user response control 424 may indicate a positive response from the user to the presented content item and/or content item segment, and interaction with user response control 426 may indicate a negative response from the user to the presented content item and/or content item segment. According to exemplary embodiments of the present disclosure, presentation of content items and/or content item segments and receiving user responses to the presented content items and/or content item segments may be iteratively repeated until the user selects a content item for viewing, accessing, or otherwise consuming.

Figure 5:
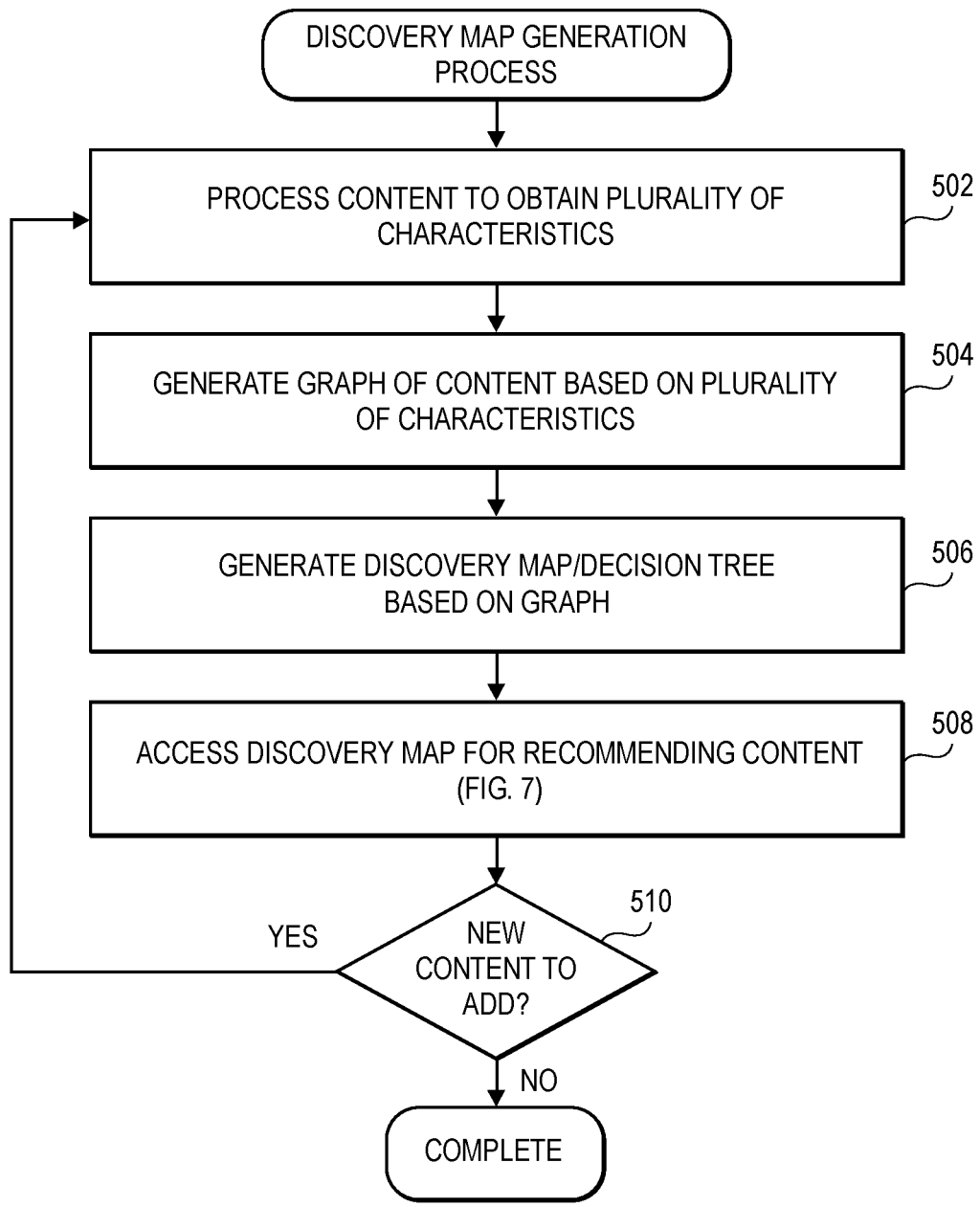
FIG. 5 is a flow diagram of an exemplary discovery map generation process, according to exemplary embodiments of the present disclosure.

FIG. 5 is a flow diagram of an exemplary discovery map generation process 500, according to exemplary embodiments of the present disclosure.

As shown in FIG. 5, exemplary discovery map generation process 500 may begin with the processing of content to obtain a plurality of characteristic information regarding each content, as in step 502. For example, a corpus of content items (and/or content item segments), which may include video content, music content, books, audio books, etc. may be processed using one or more trained learning models to extract characteristic information regarding the content items. In exemplary implementations, characteristic information relating to video content may include information related to features of the content item and/or content item segment, such as a location of the shot, a time period of the content shot, a mood of the shot, a topic of the shot, cast appearing in the shot, dialogue in the shot, costumes used in the shot, action sequences appearing in the shot, music/soundtrack played during the shot, colors present in the shot, and the like. In exemplary implementations, the extracted characteristic information may be encoded as vector representations (e.g., embeddings, feature vectors, etc.) of each feature included in the content. Further, the extracted characteristic information may also include weights for each feature that may represent the dominance, strength, etc. of each respective feature in the content.

In step 504, a content graph may be generated based on the characteristic information extracted in step 502. The content graph may store and maintain the content in an organization based on the characteristic information. For example, content items and/or content item segments having common characteristic features may be connected via an edge of the graph, and a length of the edge connecting the content items and/or content item segments may represent a weight and/or strength of the connection. Alternatively and/or in addition, the content graph may organize the content by connecting the content segments according to their characteristic features, and the distance to the features may represent a weight, strength, and/or dominance of the feature. The content graph may organize and maintain the content in other configurations, as a database, other data structure, and the like. Further, as discussed below, the content graph may be configured to be continuously updated and expanded as new content may be added to the content graph.

After generation of the content graph, a discovery map/decision tree may be generated, as in step 506. The discovery map/decision tree may be generated based on the content and the characteristic information (including the weights for each feature indicated by the characteristic information) associated with each content. In exemplary implementations, the discovery map/decision tree may include a plurality of decision nodes, where each node is associated with corresponding content. Each decision node may be connected to two or more subsequent decision nodes (e.g., a positive response decision node and a negative response decision node), which may be associated with further corresponding content. In an exemplary implementation, the discovery map/decision tree may be generated such that each decision node is connected to a first subsequent decision node (e.g., the positive response decision node) that is associated with content having similar characteristic information as the content associated with the previous decision node to which it is connected and a second subsequent decision node (e.g., the negative response decision node) that is associated with content having dissimilar characteristic information as the content associated with the previous decision node to which it is connected. According to certain aspects of the present disclosure, the discovery map/decision tree may map all the content items and/or content item segments included in the content graph.

In exemplary implementations where the discovery map/decision tree is generated with content item segments, the content item segments associated with the various decision nodes of the discovery map/decision tree may be selected to ensure that the content item segment is representative of the entirety of the content item from which the content item segment was obtained. For example, in an exemplary implementation where shots of an action movie are being selected for inclusion in a discovery map/decision tree, shots that include action sequences may be more representative of the movie and therefore selected for inclusion in the discovery map/decision tree over scenes that lack action sequences. Accordingly, this may be performed, for example, by aggregating the characteristic information associated with all the shots (e.g., content item segments) obtained from a single movie (e.g., content item) to determine the dominant characteristics of the movie. Then, the shots that include characteristic information more closely aligned with the dominant characteristics of the movie may be selected for inclusion in the discovery map/decision tree as representative of the movie.

In step 508, the discovery map/decision tree may be accessed to recommend content to a user. For example, the discovery map/decision tree may be employed to provide an actively guided content recommendation service. In such an implementation, a user may be presented with a content associated with a decision node of the discovery map/decision tree, and based on the user's response to the presented content item and/or content item segment, the discovery map/decision tree may be traversed to a second decision node and presented with a second content associated with the second decision node. The traversal of the discovery map/decision tree may be continued until a user selects a presented content item and/or content item segment. According to certain aspects of the present disclosure, the discovery map/decision tree may be pre-computed.

In step 510, it may be determined if new content is to be added to the content graph and/or the discovery map/decision tree. If new content is to be added, process 500 may return to step 502. Otherwise, process 500 may complete.

Figure 6:
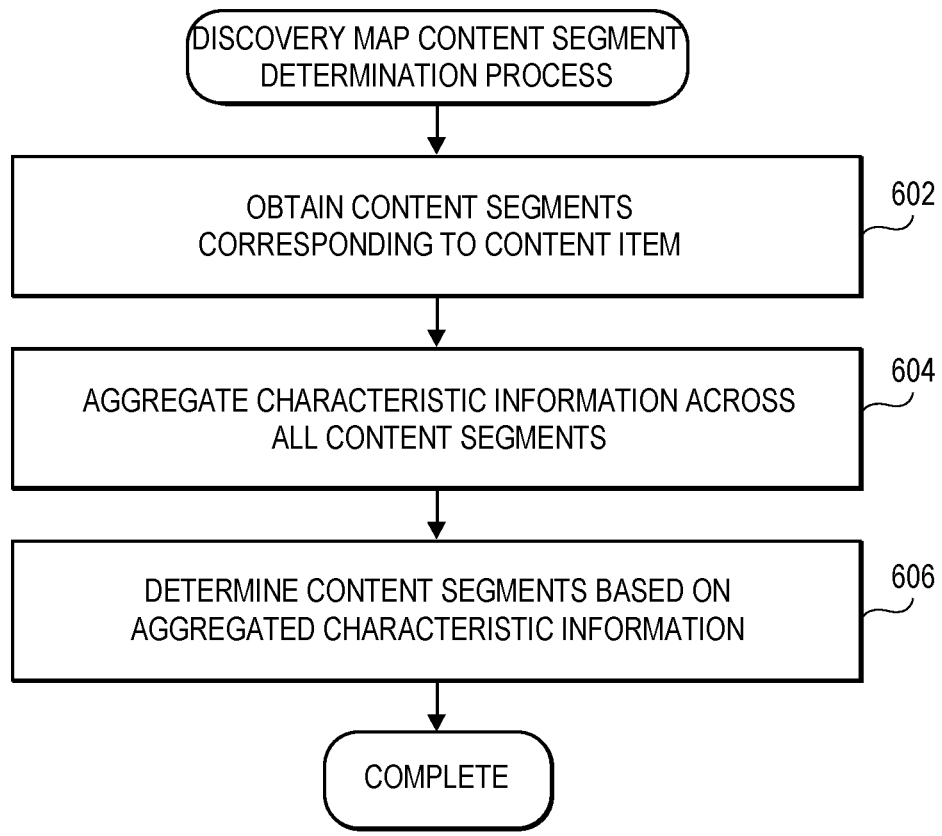
FIG. 6 is a flow diagram of an exemplary discovery map content segment determination process, according to exemplary embodiments of the present disclosure.

FIG. 6 is a flow diagram of an exemplary discovery map content segment determination process 600, according to exemplary embodiments of the present disclosure. Process 600 may be implemented, for example, in exemplary implementations where a discovery map/decision tree is generated with content item segments to ensure that the content item segments associated with the various decision nodes of the discovery map/decision tree are representative of the entirety of the content item from which the content item segment was obtained.

As shown in FIG. 6, exemplary discovery map content segment determination process 600 may begin with obtaining the content segments that correspond to a single content item, as in step 602. For example, this may include all the content item segments obtained from a single movie.

In step 604, the characteristic information associated with all the content segments may be aggregated. This may include, for example, determining a frequency indicating how many segments include a particular feature indicated by the characteristic information, a weighted sum and/or weighted average indicating the relative prominence and/or dominance of each feature over the entire content item, and the like.

Based on the aggregated characteristic information, content segments may be determined, as in step 606. For example, the content segments that include characteristic information more closely aligned with the aggregated characteristic information associated with the entirety of the content item may be selected for inclusion in the discovery map/decision tree as representative of the content.

Figure 7:
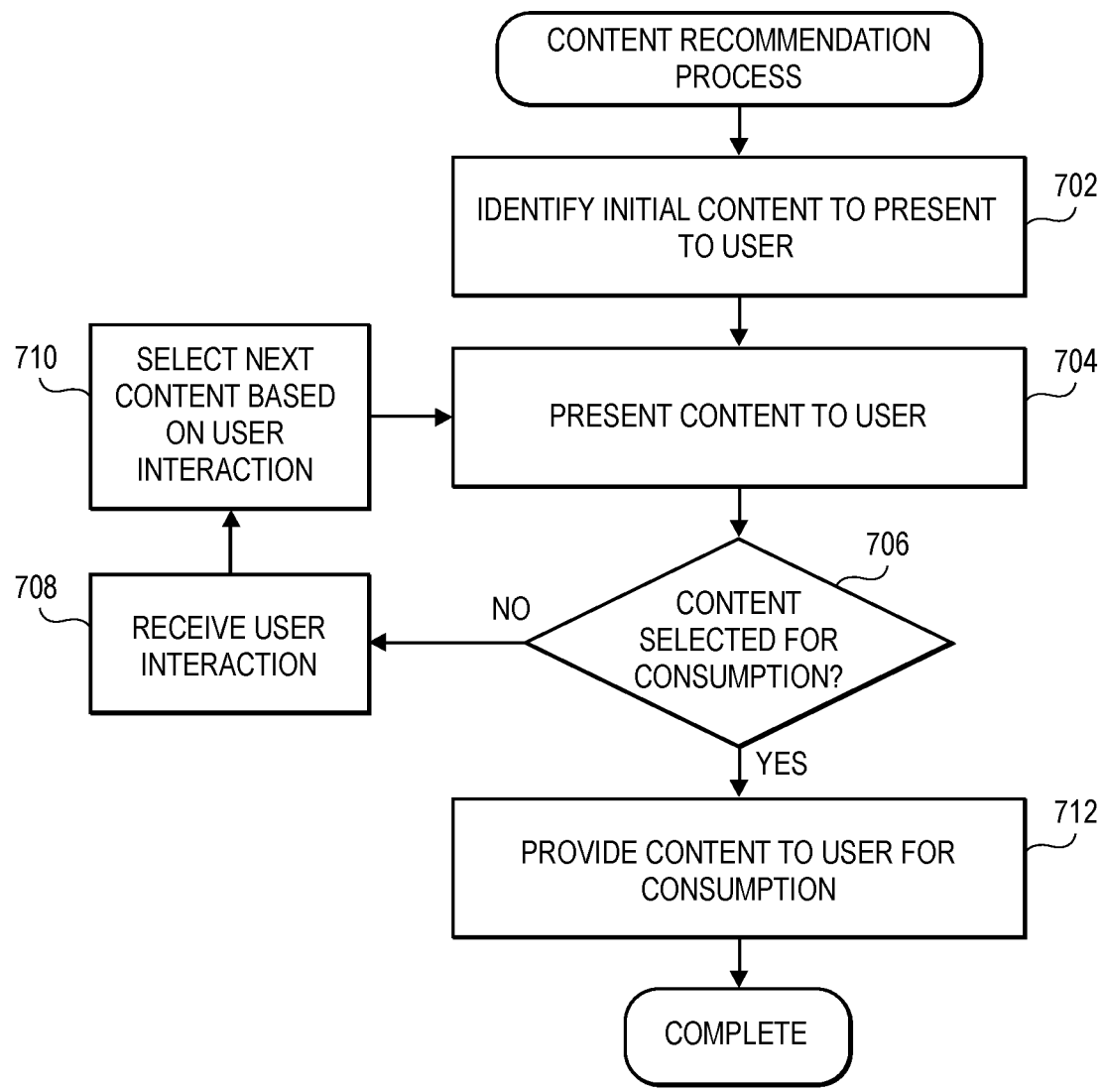
FIG. 7 is a flow diagram of an exemplary content recommendation process, according to exemplary embodiments of the present disclosure.

FIG. 7 is a flow diagram of an exemplary content recommendation process 700, according to exemplary embodiments of the present disclosure.

As shown in FIG. 7, exemplary content recommendation process 700 may begin with identifying and presenting an initial content (or content segment) to a user, as in steps 702 and 704. The initial content may be determined based on certain initial information obtained in connection with the user. For example, the user may specify certain information regarding the content that the user is seeking (e.g., genre, cast, mood, length, etc.). Alternatively and/or in addition, a user profile, which may include information such as previous content accessed and consumed by the user, user likes, user dislikes, user preferences, and the like, may be obtained and processed to determine the initial content to be presented to the user. According to exemplary implementations of the present disclosure, the presented content may be associated with a decision node of a discovery map/decision tree, as described herein.

In step 706, it may be determined if the user has selected the presented content for consumption. If the presented content was selected for consumption, the content may be provided to the user for consumption (e.g., to access, download, view, etc.), as in step 712, and process 700 may complete.

Alternatively, if the presented content was not selected for consumption, a user interaction may be received, as in step 708. This may include, for example, a positive or negative response to the presented content. In exemplary implementations, the user response may be received via an interaction with a user response control, which may be presented in a user interface. For example, the user response control may include a positive response control, such as a like button, a thumbs up button, a positive swipe control (e.g., swipe to the right, etc.), and the like, and a negative response control, such as a dislike button, a thumbs down button, a negative swipe control (e.g., swipe to the left, etc.), and the like. Accordingly, during or after presentation of the initial content item and/or content item segment, a user may interact with the user response controls to indicate a positive or negative response to the presented content.

Based on the user's response controls to the presented content, a next content may be selected, as in step 710. For example, the discovery map/decision tree may be traversed to the decision node corresponding to the user's response (e.g., positive or negative), and a content associated with the decision node may be selected as the next content to be presented.

In an exemplary implementation where the user responded positively to the presented content, the discovery map/decision tree may be traversed to a positive response decision node connected to the decision node associated with the previously presented content. The positive response decision node may be associated with one or more content, from which the next content may be selected. In exemplary implementations, the content associated with the positive decision node may include content having characteristic information similar to the characteristic information associated with the previously presented content.

Conversely, in an exemplary implementation where the user responded negatively to the presented content, the discovery map/decision tree may be traversed to a negative response decision node connected to the decision node associated with the initial content item and/or content item segment. The negative response decision node may be associated with one or more content, from which the next content may be selected. In exemplary implementations, the content associated with the negative decision node may include content segments having characteristic information dissimilar to the characteristic information associated with the previously presented content. Accordingly, the next content item may be selected in view of all the previously presented content and all the user's responses to the previously presented content. Selection of the next content is described in further detail herein at least in connection with FIGS. 1-4.

After the next content has been selected, process 700 may return to step 704, so that the selected content is presented to the user.

Figure 8:
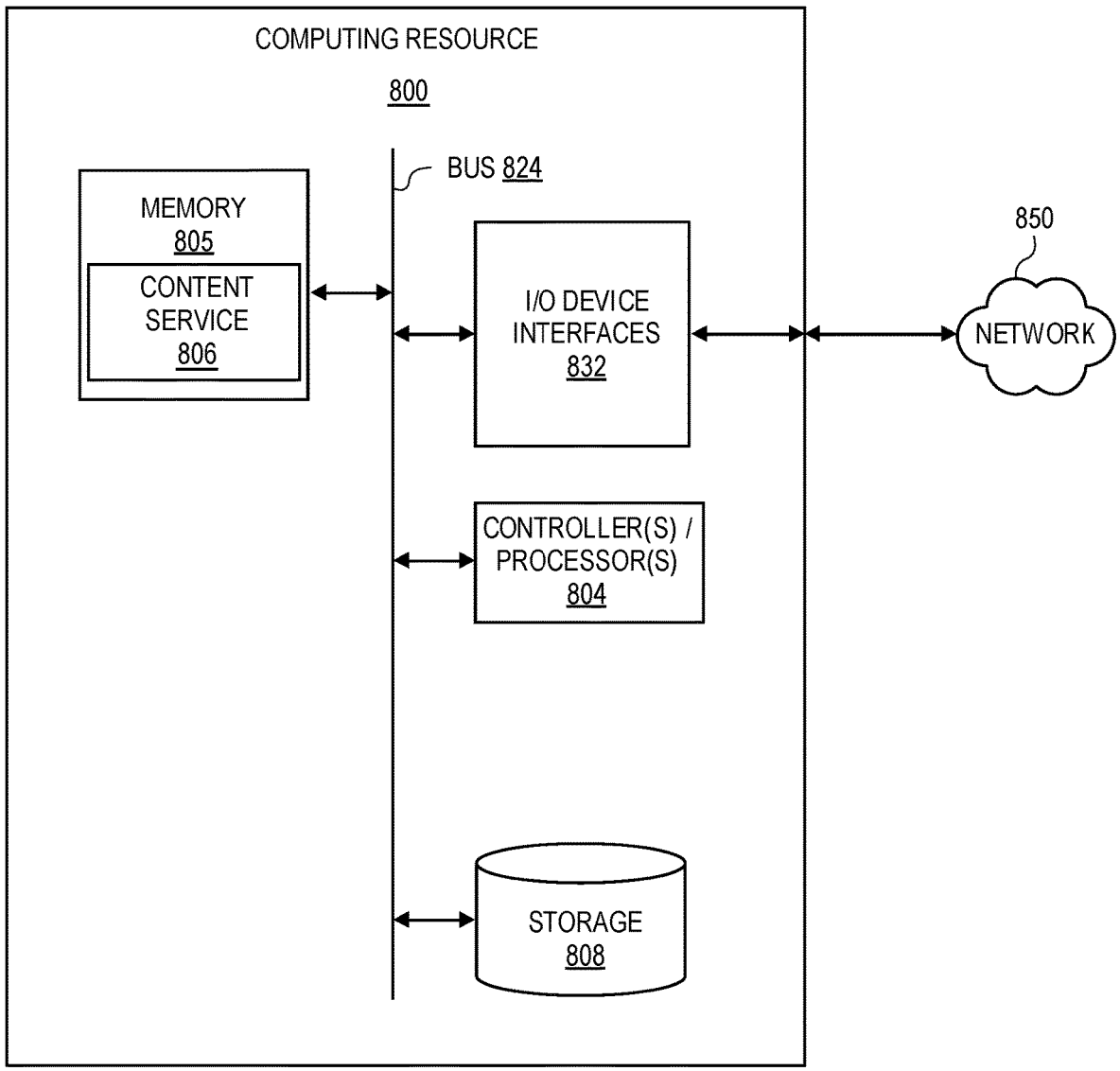
FIG. 8 is a block diagram of an exemplary computing resource, according to exemplary embodiments of the present disclosure.

FIG. 8 is a block diagram of components of computing resource 800 (e.g., computing resources 120, etc.) that may perform or provide the systems and methods, according to exemplary embodiments of the present disclosure.

Multiple such computing resources 800 may be included in the system. In operation, each of these devices (or groups of devices) may include computer-readable and computer-executable instructions that reside on computing resource 800, as will be discussed further below.

Computing resource 800 may include one or more controller(s)/processor(s) 804, that may each include a CPU for processing data and computer-readable instructions, and memory 805 for storing data and instructions. Memory 805 may individually include volatile RAM, non-volatile ROM, non-volatile MRAM, and/or other types of memory. Computing resource 800 may also include a data storage component 808 for storing data, geographic area information, constraints, mapping functions, etc. Each data storage component may individually include one or more non-volatile storage types such as magnetic storage, optical storage, solid-state storage, etc. Computing resource 800 may also be connected to removable or external non-volatile memory and/or storage (such as a removable memory card, memory key drive, networked storage, etc.) through input/output device interfaces 832.

Computer instructions for operating computing resource 800 and its various components may be executed by the controller(s)/processor(s) 804, using memory 805 as temporary "working" storage at runtime. The computer instructions may be stored in a non-transitory manner in non-volatile memory 805, storage 808, or an external device(s). Alternatively, some or all of the executable instructions may be embedded in hardware or firmware on computing resource 800 in addition to or instead of software.

For example, memory 805 may store program instructions that when executed by the controller(s)/processor(s) 804, cause the controller(s)/processors 804 to process, utilizing content service 806, a corpus of content, generate a content graph, generate a discovery map/decision tree, and provide recommended content, as discussed herein.

Computing resource 800 also includes input/output device interface 832. A variety of components may be connected through input/output device interface 832. Additionally, computing resource 800 may include address/data bus 824 for conveying data among components of computing resource 800. Each component within computing resource 800 may also be directly connected to other components in addition to (or instead of) being connected to other components across bus 824.

The disclosed implementations discussed herein may be performed on one or more computing resources, such as computing resource 800 discussed with respect to FIG. 8 or performed on a combination of one or more computing resources. Further, the components of the computing resource 800, as illustrated in FIG. 8, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

The computers, servers, devices, computing resources and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device or method to interact with the computers, servers, devices and the like, or to "select" a control, link, node, hub or any other aspect of the present disclosure.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

The data and/or computer executable instructions, programs, firmware, software and the like (also referred to herein as "computer executable" components) described herein may be stored on a computer-readable medium that is within or accessible by computers or computer components such as computing resources 800 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/ machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5-7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "similar," or "substantially" as used herein, represent a value, amount, or characteristic close to the stated value, amount, or characteristic that still performs a desired function or achieves a desired result. For example, the terms "about," "approximately," "generally," "nearly," "similar," or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   obtaining a plurality of characteristics associated with a plurality of content segments;
   generating, based at least in part on the plurality of characteristics, a content graph including edges that connect content segments of the plurality of content segments sharing common characteristics;
   generating, based at least in part on the content graph and the plurality of characteristics, a decision tree including a plurality of nodes associated with the plurality of content segments;
   accessing a first node of the decision tree that is associated with a first content segment of the plurality of content segments;
   causing the first content segment to be presented on a client device via a user interface;
   receiving, from the client device, a first interaction with the user interface in response to presentation of the first content segment;
   traversing, based at least in part on the first interaction, the decision tree from the first node to a second node of the decision tree;
   selecting, based at least in part on the first interaction and the first content segment, a second content segment associated with the second node;
   causing the second content segment to be presented on the client device via the user interface;
   receiving, from the client device, a second interaction with the user interface in response to presentation of the second content segment;
   traversing, based at least on the second interaction, the decision tree from the second node to a third node of the decision tree;
   selecting a third content segment associated with the third node, wherein selecting the third content segment is based on at least the first content segment, the first interaction, the second content segment, and the second interaction;
   receiving a third interaction selecting the third content segment for consumption; and
   providing a content item associated with the third content segment to the client device for presentation via the user interface.

2. The computer-implemented method of claim 1, wherein:
   the first content segment includes a first plurality of characteristic information;
   the second content segment includes a second plurality of characteristic information;
   the first interaction includes a positive response to the first content segment; and
   the first plurality of characteristic information and the second plurality of characteristic information indicates at least one shared feature between the first content segment and the second content segment.

3. The computer-implemented method of claim 1, wherein:
   the first content segment includes a first plurality of characteristic information;
   the second content segment includes a second plurality of characteristic information;
   the first interaction includes a negative response to the first content segment; and
   the first plurality of characteristic information and the second plurality of characteristic information indicates at least one feature that is different between the first content segment and the second content segment.

4. The computer-implemented method of claim 1, wherein the plurality of characteristic information includes a weighted vector representation of a plurality of features presented in the plurality of content segments.

5. The computer-implemented method of claim 1, wherein the second content segment includes a generated sequence of a plurality of content item segments.

6. A method, comprising:
   accessing a first node of a discovery map to determine a first content that includes a first plurality of characteristic information and is associated with the first node;
   causing the first content to be presented to a user on a client device;
   receiving a first user response to the first content via a first interaction with the client device;
   accessing, based at least in part on the first user response, a second node of the discovery map;
   determining, based at least in part on the first user response, the first plurality of characteristic information, and a second plurality of characteristic information associated with a second content, the second content associated with the second node to be presented to the user;
   receiving a second user response to the second content via a third interaction with the client device;
   accessing, based at least in part on the first user response and the second user response, a third node of the discovery map;
   determining, based at least in part on the first user response, the second user response, the first plurality of characteristic information, and a third plurality of characteristic information associated with a third content, the third content associated with the third node;
   causing the third content to be presented to the user on the client device; and
   receiving a third interaction from the client device indicating selection of the third content for consumption.

7. The method of claim 6, wherein the first plurality of characteristic information and the second plurality of characteristic information include weighted vector representations indicating features included in the first content and the second content.

8. The method of claim 6, wherein:
   the first user response includes a positive user response; and the first plurality of characteristic information and the third plurality of characteristic information indicate that the first content and the third content include at least one shared feature.

9. The method of claim 6, wherein:
the first user response includes a negative user response; and
the first plurality of characteristic information and the third plurality of characteristic information indicate that the first content and the third content include at least one feature that is different.

10. The method of claim 6, wherein:
the first user response includes a positive user response;
the second user response includes a negative user response; and
determining the third content includes:
identifying, based at least in part on the first plurality of characteristic information and the second plurality of characteristic information, at least one feature included in the second content that was not included in the first content; and
determining the third content based at least in part on a determination that the third content does not include the at least one feature.

11. The method of claim 6, wherein:
the first user response includes a first positive user response;
the second user response includes a second positive user response; and
determining the third content includes:
identifying, based at least in part on the first plurality of characteristic information and the second plurality of characteristic information, at least one feature included in the first content and the second content; and
determining the third content based at least in part on a determination that the third content includes the at least one feature.

12. The method of claim 6, wherein:
the first user response includes a first negative user response;
the second user response includes a second negative user response; and
determining the third content includes:
identifying, based at least in part on the first plurality of characteristic information and the second plurality of characteristic information, at least one first feature included in the first content and at least one second feature included in the second content; and
determining the third content based at least in part on a determination that the third content does not include the at least one first feature and does not include the at least one second feature.

13. The method of claim 6, wherein determining the third content includes:
determining, based at least in part on the first plurality of characteristic information and the first user response, that no single content segment includes all of a plurality of features to be presented to the user on the client device in a subsequent segment; and
generating, based at least in part on all of the plurality of features to be presented to the user, a sequence of content segments as the third content.

14. The method of claim 6, wherein the third content includes at least one of:
a video content;
a television show;
a movie;
a musical content;
a book;
an article; or
a paper.

15. A computing system, comprising:
one or more processors; and
a memory coupled to the one or more processors and including program instructions that, when executed by the one or more processors, cause the one or more processors to at least:
generate, based at least in part on a plurality of characteristic information associated with a plurality of content, a discovery map including a plurality of decision nodes and defining relationships between the plurality of content;
access a first node of the discovery map that is associated with a first content of the plurality of content;
cause the first content to be presented to a user via a user interface on a client device;
receive, via a first interaction with the user interface, a first positive user response to the first content;
access, based at least in part on the first positive user response to the first content, a second node of the discovery map that is associated with a second content of the plurality of content;
cause the second content to be presented to the user via the user interface on the client device;
receive, via a second interaction with the user interface, a first negative user response to the second content;
access, based at least in part on the first negative user response to the second content, a third node of the discovery map that is associated with at least one third content;
determine, based at least in part on the first content, the first positive user response to the first content, the second content, and the first negative user response to the second content, a fourth content from the at least one third content; and
cause the fourth content to the presented to the user via the user interface on the client device.

16. The computing system of claim 15, wherein:
the first content includes a first plurality of characteristic information;
the second content includes a second plurality of characteristic information;
the fourth content includes a third plurality of characteristic information; and
the first plurality of characteristic information, the second plurality of characteristic information, and the third plurality of characteristic information include weighted vector representations indicating features included in the first content, the second content, and the fourth content.

17. The computing system of claim 16, wherein weights of the weighted vector representations correspond to a dominance of respective features assigned to the corresponding weights.

18. The computing system of claim 17, wherein the second content and the fourth content are determined based at least in part on the weights corresponding to the features indicated by the second plurality of characteristic information and the third plurality of characteristic information.

19. The computing system of claim 15, wherein:
each of the plurality of content is a segment of a respective content item; and generation of the discovery map includes identifying content segments that are representative of the respective content items.

* * * * *